UNITED STATES PATENT OFFICE.

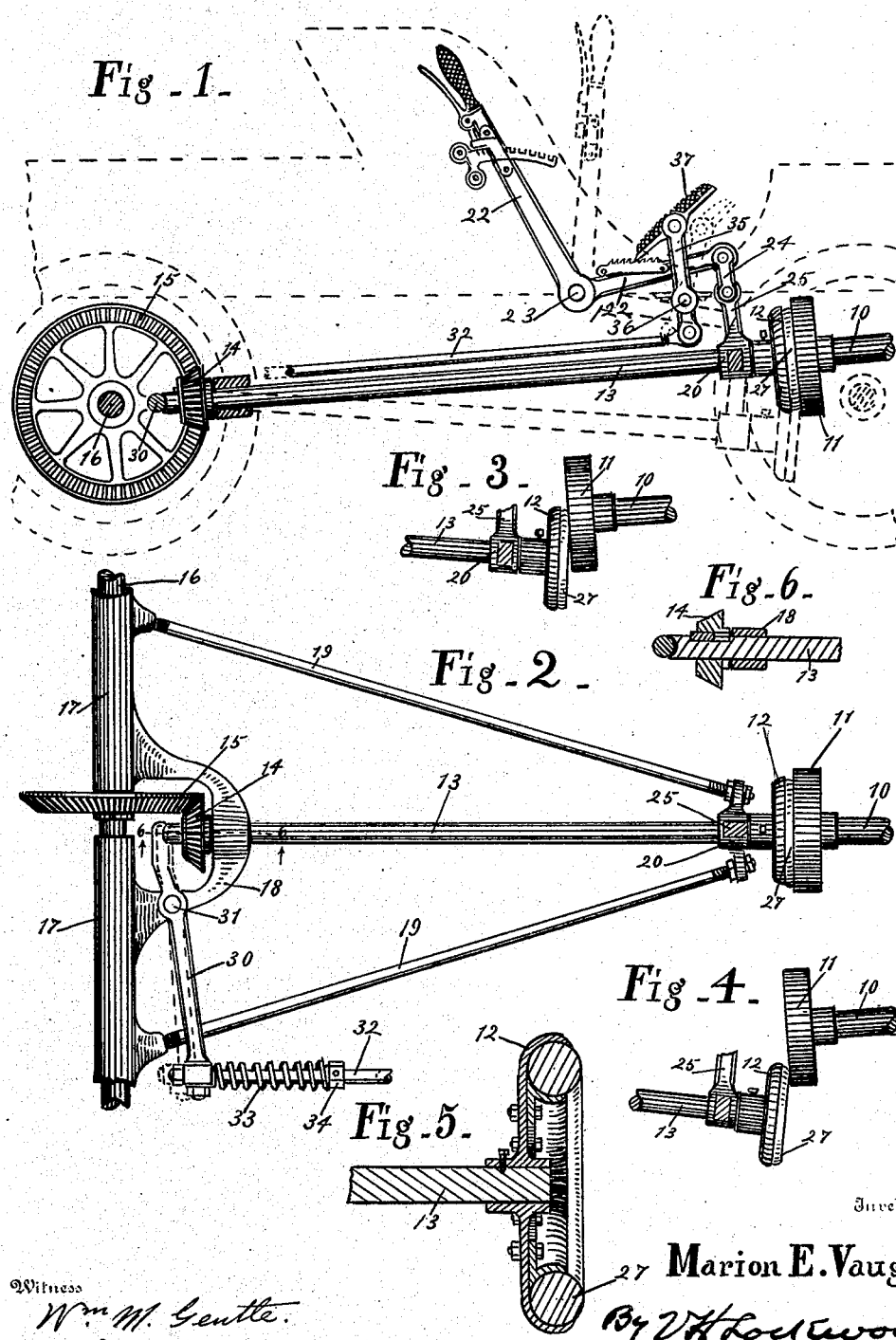

MARION E. VAUGHN, OF PLAINFIELD, INDIANA.

VARIABLE-SPEED DRIVING MECHANISM.

No. 900,450.　　　　Specification of Letters Patent.　　　　Patented Oct. 6, 1908.

Application filed February 8, 1906. Serial No. 300,103.

*To all whom it may concern:*

Be it known that I, MARION E. VAUGHN, of Plainfield, county of Hendricks, and State of Indiana, have invented a certain new and useful Variable-Speed Driving Mechanism; and I do hereby declare that the following is a full, clear, and exact description thereof, reference being had to the accompanying drawings, in which like numerals refer to like parts.

The object of this invention is to provide a speed changing means in combination with a friction driving mechanism that is simple in construction and is easy to operate and regulate and change the speed.

The chief feature of the invention consists of means for causing a variation in the extent of frictional engagement between the driving wheel and the driven wheel when the latter is moved across the face or side of the driving wheel, the arrangement being such that the extent of frictional engagement of the driven wheel with the driving wheel increases as the driven wheel is shifted to a position bringing about an increase of speed. In other words the greater the speed and need of frictional engagement the greater will be the extent of such frictional engagement and the greatest extent of frictional engagement exists when the wheels are coaxial and then the highest speed will be attained. To that end the driven wheel is mounted in a shaft or frame that oscillates in the arc of a circle with reference to which the side of the driving wheel is tangential and means are provided for shifting the position of the driven wheel in the arc of a circle.

The full nature of this invention will be more fully understood from the accompanying drawings and the following description and claims.

In Figure 1 there is shown a side elevation of the speed transmitting and changing mechanism of an automobile, parts being broken away and the engine not being shown and the automobile being outlined by dotted lines, and a changed position of the parts being shown by dotted lines. Fig. 2 is a plan view of the power transmitting means, parts broken away. Figs. 3 and 4 show the friction wheels having shafts on which they are mounted, in different positions. Fig. 5 is a central transverse section through the driven wheel. Fig. 6 is a section on the line 6—6 of Fig. 2.

In the drawings there is shown by dotted lines the outline of the bed of an automobile and of the front and rear wheels. The engine of the automobile is not shown but 10 is a shaft driven by the engine and 11 is the driving wheel that is in frictional engagement with the driven wheel 12 mounted on the driven shaft 13 which transmits power through the gears 14 and 15 to the rear axle 16 of the automobile on which the rear wheels are secured.

A frame is provided in which the transmitting mechanism is mounted. This frame consists of tubes 17 placed loosely on the rear axle 16, one on each side of the gear 15 and connected by a yoke 18 in which the rear end of the power transmitting shaft 13 is mounted. Two brace rods 19, one on each side of the shaft 13, are connected at their rear ends to the tubes 17 rigidly and at their forward ends to a bearing frame 20 in which the forward end of the driven shaft 13 is mounted. Thus the construction is arranged, the frame consisting of the parts 17, 18, 19 and 20; together with the driven wheel 12 and shaft 13, is at the forward end vertically movable or oscillatory as shown by the full and dotted lines in Fig. 1. Said parts are oscillated by the hand-lever 22 which is secured on a shaft 23, and that shaft carries a crank 122 connected by the link 24 with an arm 25 extending upwardly from the bearing frame 20. When said hand-lever 22 is drawn rearward, as shown in full lines in Fig. 1, the driven wheel 12 will be elevated, and when said lever is thrown forward it will depress the friction wheel 12, as appears by the dotted lines in Fig. 1.

Change of speed is caused by changing the position of the driven wheel 12 with reference to the driving wheel 11. When they are, as shown by full lines in Figs. 1 and 2, coaxial, the highest speed will be attained. When the driven wheel 12 is depressed somewhat, only the upper part of its forward side surface will be in frictional engagement with the side surface of the driving wheel, as the upper contacting part of the driven wheel is moved more closely to the center of the driving wheel the speed will be correspondingly diminished. When the driven wheel reaches the position shown in Fig. 3 so that it contacts only with the center of the driving wheel there will be practically no speed. When the driven wheel is forced downward further thereon below the center of the driving wheel, the machine will be reversed and the axle 16 driven in an opposite direction from the direction when the parts are as shown in Fig. 1. Such reversing position is shown in Fig. 1 by dotted lines and the extreme reversing position is shown in Fig. 4.

To increase the friction between wheels 12 and 13 I preferably form it as shown in Fig. 5 with a rubber ring 27 secured to the side of the driven wheel that is next to the driving wheel. The only part of the driven wheel that engages the driving wheel is this rubber ring. One effect of this construction is that while running at full speed when all power generated by the engine is being transmitted to the driven wheel 12 the entire annular face of the rubber ring 27 is in frictional engagement with the driving wheel so that there will be no slippage. The extent of the ring 27 that is in engagement with the driven wheel during forward movement is least when it is at the center of the driving wheel, as shown in Fig. 3, and when there is little or no speed, and the extent of such engaging surface of the ring 27 increases proportionately as the speed and work increases. This characteristic arises from the fact that the driven wheel is mounted at the end of an oscillatory frame fulcrumed some distance from the driving wheel and is moved in the arc of a circle whereas the driving wheel is fixed and its side is tangential to said arc. I also add means to enable the chauffeur to increase or diminish the forcibleness of the engagement between the two wheels 11 and 12. This consists of a lever 30 fulcrumed at 31 on the yoke 18 and at its inner end engaging the inner end of the shaft 13. The outer end of the lever 30 has a connecting rod 32 passing loosely through it and on said rod 32 there is a spring 33 between the lever 30 and the collar 34. Said rod 32 is forced rearward by a foot-lever 35 fulcrumed at the vehicle bed 36 and having on its upper end a pedal 37. The spring 33 normally holds the wheel 12 against the wheel 11 but by pressing on the pedal 37 the forcibleness of the frictional engagement between the wheels 11 and 12 may be increased. This is helpful when the load is heavy or there is any tendency of the wheel 12 to slip on the drive wheel 11. This action of the shaft 13 is rendered possible by splining the gear 14 on the shaft as shown by Fig. 6.

What I claim as my invention and desire to secure by Letters Patent

1. In a speed changing mechanism, driving and driven wheels with their sides in frictional engagement, and means for shifting the position of one wheel in the arc of a circle to which the engaging surface of the other wheel is tangential.

2. In a speed changing mechanism, driving and driven wheels with their sides in frictional engagement, one of said wheels being mounted yieldingly with relation to the other wheel, and means for shifting the position of one wheel in the arc of a circle to which the engaging surface of the other wheel is tangential.

3. In a speed changing mechanism, a driving wheel, a driven wheel with its side in frictional engagement with the side of the driving wheel, the engaging surface of one of said wheels being yielding, and means for shifting the position of the driven wheel, one of said wheels being so mounted that the extent of the engaging surfaces is varied by the shifting of said driven wheel.

4. In a speed changing mechanism, a driving wheel, a driven wheel with a yielding contact surface on its side in frictional engagement with the side of the driving wheel, one of said wheels being mounted yieldingly in relation to the other wheel means for mounting the driven wheel so that when coaxial with the driving wheel its entire engaging surface will be in contact with the driving wheel and the extent of such engaging surface of the driven wheel will diminish proportionately as it is shifted away from such coaxial position.

5. In a speed changing mechanism, a driving wheel, a driven wheel with its side in frictional engagement with the side of the driving wheel, a shaft on which said driving wheel is mounted that is substantially coaxial with the driving wheel, means for mounting said shaft so that the end carrying the driven wheel may be oscillated, and means for oscillating such end of the driven shaft.

6. In a speed changing mechanism, a driving wheel, a driven wheel with its side in frictional engagement with the side of the driving wheel, a shaft carrying the driven wheel that is coaxial with the driving wheel, a frame in which said shaft is mounted that is fulcrumed at a point remote from said driving wheel so that the end thereof carrying the driven wheel is free to oscillate, and means for oscillating said end of the shaft.

7. In a speed changing mechanism, a driving wheel, a driven wheel with its side in frictional engagement with the side of the driving wheel, a driven shaft carrying said driven wheel that is substantially coaxial with the driving wheel, means through which power is transmitted from said driven shaft, a frame fulcrumed on said means and carrying said driven shaft, the end of said frame and driven shaft near the driven wheel being free to oscillate, and means for oscillating said end of the frame.

8. In a speed changing mechanism, a vehicle axle, a frame fulcrumed thereon, a driven shaft mounted in said frame at a right angle to said axle, gears on said axle and shaft for transmitting power from the latter to the former, a driving wheel mounted coaxial with said shaft, a driven wheel on the oscillating end of said shaft, and means for oscillating such end of the shaft.

9. In a speed changing mechanism, a driving wheel, a driven wheel provided with a yielding annular surface on its side that frictionally engages the side of the driving wheel, means for shifting the position of said driven wheel, and means for varying the extent of said annular surface that is in frictional engagement with said driving wheel.

10. In a speed changing mechanism, a driving wheel, a driven wheel with a yielding contact surface on its side in frictional engagement with the side of the driving wheel, said driven wheel being so mounted that the extent of the engaging surfaces is varied by shifting means for shifting the position of the driven wheel, means for mounting the driven wheel that in such shifting of its position varies the extent of its engaging surface, and means for varying the forcefulness of said frictional engagement.

11. In a speed changing mechanism, a driving wheel, a driven wheel with a yielding contact surface on its side in frictional engagement with the side of the driving wheel, means for shifting the position of the driven wheel, means for mounting the driven wheel so that in such shifting of its position the extent of its engaging surface will be varied, and means for increasing the forcefulness of the frictional engagement of the driven wheel with the driving wheel.

12. In a speed changing mechanism, a driving wheel, a driven wheel with its side in frictional engagement with the side of the driving wheel, a shaft on which said driven wheel is mounted that is substantially coaxial with the driving wheel, means for mounting said shaft so that the end carrying the driven wheel will oscillate, means for oscillating such end of said driven shaft, and means that forces said shaft longitudinally toward the driving wheel to increase the forcefulness of the engagement of said wheels.

13. In a speed changing mechanism, a driving wheel, a driven wheel with its side in frictional engagement with the side of the driving wheel, a shaft carrying the driven wheel that is coaxial with the driving wheel, a frame in which said shaft is mounted that is fulcrumed at a point remote from said driving wheel and the end thereof adjacent the driving wheel is free to oscillate, means for oscillating said end of the frame, a lever pivoted on said frame with one end engaging the inner end of said shaft, a spring controlled rod for actuating said lever that forces said shaft towards the driving wheel, and means for actuating said spring controlled rod.

14. The combination of a revoluble driving shaft, a revoluble driven shaft friction disks mounted upon said shafts respectively and adapted to engage each other, and means for varying the degree of pressure between said friction disks, and also for the purpose of locking said disks together for direct drive.

15. In a change speed gear for motor driven vehicles, the combination with the motor shaft, of a disk fixed thereto and having a rearwardly facing friction surface, a driving axle, a driving shaft geared to the axle and swinging about the same as an axis, and a disk carried by the driving shaft and facing the motor shaft disk and designed for frictional engagement near its periphery with the face of the motor shaft disk, and shiftable by the swinging movement of the driving shaft towards and from the center of said motor-shaft disk.

16. In a change speed gear for motor driven vehicles, the combination with the motor shaft, of a disk fixed thereto and having a rearwardly facing friction surface, a driving axle, a driving shaft geared to the axle and swinging about the same as an axis, a disk carried by the driving shaft and facing the motor shaft disk and designed for frictional engagement near its periphery with the friction surface of the motor shaft disk and shiftable by the swinging movement of the shaft towards and from the center of said motor-shaft disk and a lever for swinging said driving shaft and locking it in adjusted positions.

17. A pair of rotatable bodies so mounted on a common plane that a side of one body may engage a side of the other body, each body being operative by reason of such engagement to cause the other body to rotate whether said bodies be in axial alinement or angularly arranged one with the other.

18. A pair of rotatable bodies so mounted on a common plane that a side of one body may frictionally engage a side of the other body, each body being operative by reason of such frictional engagement to cause the other body to rotate whether said bodies be in axial alinement or angularly arranged one with the other.

19. A pair of rotatable bodies so mounted on a common plane that a side of one body may engage a side of the other body, each body being operative by reason of such engagement to cause the other body to rotate; one of said bodies being oscillatably movable transversely of its axis.

20. A pair of rotatable bodies so mounted on a common plane that a side of one body may engage a side of the other body, each body being operative by reason of such engagement to cause the other body to rotate; one of said bodies being oscillatably movable transversely of its axis; all in combination with means for moving one of said bodies oscillatably transversely of its axis.

21. A pair of rotatable bodies so mounted on a common plane that a side of one body may engage a side of the other body, each body being operative by reason of such engagement to cause the other body to rotate; one of said bodies being oscillatably movable transversely of its axis; all in combination with means for moving one of said bodies oscillatably transversely of its axis, and means for locking the oscillatably movable body either in axial alinement or in angular adjustment with the other body.

22. A pair of rotatable bodies so mounted on a common plane that a side of one body may engage a side of the other body, each body being operative by reason of such engagement to cause the other body to rotate whether said bodies be concentric with or eccentric to each other; one of said bodies being oscillatably movable transversely of its axis; all combined with means for moving one of said bodies oscillatably transversely of its axis and means for locking the oscillatably movable body either in axial alinement or in angular adjustment with the other body.

23. A pair of rotatable bodies mounted on a common plane, each body having a surface which is engageable with a surface of the other body at variable and radially unequal parts of said surfaces and each body being operative by reason of such engagement to cause the other body to rotate at variable speed; one of said bodies being oscillatably movable transversely of its axis.

24. A pair of rotatable bodies mounted on a common plane, each body having a surface that is engageable with a surface of the other body at variable and radially unequal parts of said surfaces and each body being operative by reason of such engagement to cause the other body to rotate at variable speed; one of said bodies being oscillatably movable transversely of its axis; all combined with means for moving one of said bodies oscillatably transversely of its axis.

25. A pair of rotatable bodies mounted on a common plane each body having a surface which is engageable with a surface of the other body at variable and radially unequal parts of said surfaces and each body being operative by reason of such engagement to cause the other body to rotate at variable speed; one of said bodies being oscillatably movable transversely of its axis; all combined with means for moving one of said bodies oscillatably transversely of its axis, and means for locking the oscillatably movable body either in axial alinement or in angular adjustment with the other body.

26. A pair of rotatable bodies mounted on a common plane, each body having a surface which is engageable with a surface of the other body and each body being operative by reason of such engagement to cause the other body to rotate; one of said bodies being oscillatably movable transversely of its axis; all combined with means for moving one of said bodies oscillatably transversely of its axis and means for locking the oscillatably movable body either in axial alinement or in angular adjustment with the other body.

In witness whereof, I have hereunto affixed my signature in the presence of the witnesses herein named.

MARION E. VAUGHN.

Witnesses:
G. G. CUMBERWORTH,
A. M. HAVENS.